US011760815B2

(12) United States Patent
Murray (10) Patent No.: US 11,760,815 B2
(45) Date of Patent: Sep. 19, 2023

(54) HALOGEN RECOVERY IN A PROCESS FOR HALOGENATING UNSATURATED ISOOLEFIN COPOLYMER

(71) Applicant: ARLANXEO Singapore Pte. Ltd., Singapore (SG)

(72) Inventor: Adrian H. Murray, London (CA)

(73) Assignee: ARLANXEO SINGAPORE PTE. LTD., Singapore (SG)

( * ) Notice: Subject to any disclaimer, the term of this patent is extended or adjusted under 35 U.S.C. 154(b) by 196 days.

(21) Appl. No.: 17/311,267

(22) PCT Filed: Dec. 17, 2019

(86) PCT No.: PCT/CA2019/051836
§ 371 (c)(1),
(2) Date: Jun. 4, 2021

(87) PCT Pub. No.: WO2020/124223
PCT Pub. Date: Jun. 25, 2020

(65) Prior Publication Data
US 2022/0017659 A1    Jan. 20, 2022

(30) Foreign Application Priority Data
Dec. 21, 2018 (EP) .................................. 18215140

(51) Int. Cl.
*C08F 8/22* (2006.01)
*C08F 210/12* (2006.01)
*C08F 210/10* (2006.01)

(52) U.S. Cl.
CPC .............. *C08F 8/22* (2013.01); *C08F 210/10* (2013.01); *C08F 210/12* (2013.01); *C08F 2800/10* (2013.01); *C08F 2810/50* (2013.01)

(58) Field of Classification Search
CPC .. C08F 8/22; C08F 8/20; C08F 210/10; C08F 210/14
See application file for complete search history.

(56) References Cited

U.S. PATENT DOCUMENTS

| | | | |
|---|---|---|---|
| 2,637,751 A | 5/1953 | Brooks et al. | |
| 2,944,578 A | 7/1960 | Baldwin et al. | |
| 2,948,709 A | 8/1960 | Kuntz et al. | |
| 2,964,493 A | 12/1960 | Hakala et al. | |
| 3,018,275 A * | 1/1962 | Cottle | C08F 8/20 |
| | | | 525/356 |
| 3,278,467 A | 10/1966 | Burke et al. | |
| 3,932,370 A | 1/1976 | Landi et al. | |
| 3,960,988 A | 6/1976 | Kent | |
| 4,245,060 A | 1/1981 | Powers | |
| 4,405,760 A | 9/1983 | Howard, Jr. et al. | |
| 4,501,859 A | 2/1985 | Newman | |
| 5,066,730 A | 11/1991 | Kennedy et al. | |
| 5,408,018 A | 4/1995 | Rath | |
| 5,569,723 A | 10/1996 | Baade et al. | |
| 5,670,582 A * | 9/1997 | Chung | C08F 8/22 |
| | | | 525/356 |
| 5,674,955 A | 10/1997 | Kerr et al. | |
| 5,681,901 A | 10/1997 | Newman | |
| 5,886,106 A | 3/1999 | Sumner et al. | |
| 7,001,966 B2 | 2/2006 | Lang et al. | |
| 9,644,041 B2 | 9/2017 | Groemping et al. | |
| 2008/0227922 A1 | 9/2008 | Rath et al. | |
| 2013/0131281 A1* | 5/2013 | Gronowski | C08F 210/12 |
| | | | 525/356 |
| 2014/0309362 A1* | 10/2014 | Leiberich | C09J 115/02 |
| | | | 524/574 |
| 2016/0312021 A1 | 10/2016 | Thompson et al. | |
| 2017/0226238 A1* | 8/2017 | Gu | C08K 5/134 |
| 2022/0017651 A1 | 1/2022 | Davidson et al. | |
| 2022/0017655 A1 | 1/2022 | Thompson | |
| 2022/0017658 A1 | 1/2022 | Murray | |
| 2022/0025084 A1 | 1/2022 | Murray | |

FOREIGN PATENT DOCUMENTS

| | | |
|---|---|---|
| CA | 1265891 A | 2/1990 |
| CA | 2787228 A1 | 7/2011 |
| CA | 2836521 A1 | 11/2012 |
| CA | 2934725 A1 | 7/2015 |
| EP | 0646103 B1 | 8/1997 |
| EP | 1215240 A1 | 6/2002 |

(Continued)

OTHER PUBLICATIONS

Co-pending U.S. Appl. No. 17/299,508, filed Jun. 3, 2021. (Published as US 2022/0025084).
Co-pending U.S. Appl. No. 17/299,608, filed Jun. 3, 2021. (Published as US 2022/0017658).
Co-pending U.S. Appl. No. 17/311,297, filed Jun. 4, 2021. (Published as US 2022/0017651 A1).
Co-pending U.S. Appl. No. 17/311,857, filed Jun. 8, 2021. (Published as US 2022/0017655 A1).
International Search Report and Written Opinion, PCT Application No. PCT/CA2019/051834 dated Jun. 25, 2020.
International Search Report and Written Opinion, PCT Application No. PCT/CA2019/051835 dated Mar. 3, 2020.

(Continued)

*Primary Examiner* — Robert C Boyle
(74) *Attorney, Agent, or Firm* — The Dobrusin Law Firm, P.C.

(57) ABSTRACT

A process for producing a halogenated isoolefin copolymer involves contacting an unsaturated isoolefin copolymer cement, the cement containing an unsaturated isoolefin copolymer dissolved in an organic solvent, under halogenation conditions with a halogenating agent and an aqueous solution of an organic peracid oxidant to form a two-phase reaction medium having an organic phase and an aqueous phase, the organic peracid oxidant capable of converting hydrogen halide to free halogen. The process leads to higher halogen utilization even when the cement contains significant amounts of water and without the use of an emulsifier.

18 Claims, 7 Drawing Sheets

(56) References Cited

FOREIGN PATENT DOCUMENTS

| | | |
|---|---|---|
| EP | 1479724 A1 | 11/2004 |
| EP | 2966097 A1 | 1/2016 |
| GB | 839270 A | 6/1960 |
| JP | 2015/164966 A1 | 11/2015 |
| WO | H0297509 A | 4/1990 |
| WO | 98/003562 A1 | 1/1998 |
| WO | 2010/006983 A1 | 1/2010 |
| WO | 2011/089091 A1 | 7/2011 |
| WO | 2011/089092 A1 | 7/2011 |
| WO | 2013/011017 A1 | 1/2013 |
| WO | 2015/095961 A1 | 7/2015 |
| WO | 2015/164965 A | 11/2015 |
| WO | 2015164964 A | 11/2015 |
| WO | 2016/149802 A | 9/2016 |

OTHER PUBLICATIONS

International Search Report and Written Opinion, PCT Application No. PCT/CA2019/051799 dated Feb. 28, 2020.

International Search Report and Written Opinion, PCT Application No. PCT/CA2019/051818 dated Mar. 19, 2020.

Rubber Technology, 3rd Ed., Edited by Maurice Morton, Kluwer Academic Publishers, pp. 297-300 or U.S. Pat. No. 5,886,106 issued Mar. 23, 1999.

Shiman, D.I. et al., "Cationic Polymerization of Isobutylene by AlCl3/Ether Complexes in Non-Polar Solvents: Effect of Ether Structure on the Selectivity of β-H Elimination". Polymer, Feb. 27, 2013, vol. 54 (9), pp. 2235-2242, ISSN 0032-3861. Section 3.1.2; Table 2.

Vasilenko, I.V. et al., "Cationic Polymeriztion of Isobutylene in Toluene Toward Well-Defined Exo-Olefin Terminated Medium Molecular Weight Polyisobutylenes under Mild Conditions". Polymer Chemistry, Jan. 23, 2017, vol. 8 (8), pp. 1417-1425, ISSN 1759-9962. Page 1422, right-hand side colume; Supplemental Information document, Table S3.

International Search Report and Written Opinion, PCT Application No. PCT/CA2019/051836 dated Feb. 18, 2020.

Kaszas, Bromination of Butyl Rubber in The Presence of Electrophilic Solvents and Oxidizing Agents, Rubber Chemistry and Technology, American Chemical Society, Rubber Division, vol. 73, No. 2, May 2000, pp. 356-365.

Extended European Search Report, EP Application No. 19900382.3 dated Dec. 14, 2022.

Extended European Search Report dated Dec. 9, 2022, Application No. 19900153.8.

Extended European Search Report dated Dec. 13, 2022, Application No. 19901228,7.

Extended European Search Report dated Dec. 2, 2022, Application No. 19905971.8.

Elias, Hans-Georg: "Makromolekule—Band 3: Industrielle Polymere und Synthesen", Wiley VCH, vol. 6, p. 175, 5.2.10 (Broken up into 6 parts due to size).

Extended European Search Report dated Oct. 13, 2022, Application No. 19899056.6.

Mishra Munmaya K et al.: "Living Carbocationic Polymerization. VII. Living Polymerization of Isobutylene by Tertiary Alkyl (Or Aryl) Methyl Ether/Boron Trichloride Complexes", Journal of Macromolecular Science: Part A—Chemis, Marcel Dekker, New York, NY, US, vol. A24, No. 8, 1987, pp. 933-948, XP009156751, ISSN: 0022-233X, DOI: 10.1080/00222338708076927 (Broken up into 2 parts due to size).

\* cited by examiner

HALOGEN RECOVERY IN A PROCESS FOR HALOGENATING UNSATURATED ISOOLEFIN COPOLYMER

CLAIM OF PRIORITY

This application is a national phase filing under 35 USC § 371 from PCT Patent Application serial number PCT/CA2019/051836 filed on Dec. 17, 2019 and published as WO 2020/0124223 A1 on Jun. 25, 2020, which claims priority to European Patent Application Number EP 18215140.7 filed on Dec. 21, 2018. PCT Patent Application serial number PCT/CA2019/051836 and European Patent Application Number EP 18215140.7 are each incorporated by reference herein in its entirety.

FIELD

This application relates to a process for halogenating an unsaturated isoolefin copolymer.

BACKGROUND

In the standard process for brominating butyl rubber to form bromobutyl rubber, molecular bromine ($Br_2$) is used as the brominating agent. The process results in the evolution of hydrogen bromide (HBr), as a by-product which, under normal conditions, does not further brominate the butyl rubber polymer. Therefore, the theoretical maximum fraction of bromine present in the reaction mixture which can be introduced into the butyl rubber polymer is 50%. However, in practice the fraction is usually less than 45%, and is less than 35% in both laboratory and production plant settings.

Known methods (US 2014/0309362, U.S. Pat. Nos. 3,018,275, 5,681,901) to enhance bromine utilization during butyl rubber bromination involve the application of at least 0.5 mol per mol of brominating agent of a water-soluble oxidizing agent, such as hydrogen peroxide, which re-oxidizes the hydrogen bromide back to elemental bromine. The oxidizing agent can be an aqueous solution, or an aqueous emulsion in an organic solvent. Since the oxidizing agent is only soluble in water, the rate of reaction is governed by the rate in which the reactants can exchange between the organic and aqueous phases, thus requiring a longer reaction time. Further, these methods require very low concentrations of water to be present in the bromination medium. The benefits observed from the use of an oxidizing agent in the bromination medium decrease dramatically with water concentrations greater than 1 wt %, presenting significant challenges and cost industrial, because additional equipment and energy may be needed to reduce the water content in the bromination medium from 10-20 wt % down to below 1 wt %. With specific reference to U.S. Pat. No. 5,681,901, peracid is mentioned as a route to forming hydrogen peroxide. Especially when considering the partition coefficients of peracids, there is no expectation that peracids would perform any better than the combination of hydrogen peroxide and emulsifier.

It is known to brominate alkyl rubbers with bromine in the presence of organic azo compounds and/or hypochlorites (U.S. Pat. No. 5,569,723). Also, halogenated butyl rubber may be produced by using N-halo organic compounds as the halogen source, in the presence of minor proportions of peroxide catalysts (U.S. Pat. No. 2,948,709), but such a process relies on the addition of a specific halogen source (N-halo compounds) as a means of halogen addition to butyl rubber, instead of conventional use of molecular halogens (bromine, chlorine), catalyzed by peroxides.

In addition, some processes involve post-halogenation recycling by neutralizing HBr to yield sodium bromide (NaBr), washing the NaBr from the halogenated butyl rubber into the aqueous stream, and converting the NaBr to $Br_2$ using $Cl_2$ gas, for example by the Blowout Process. This ex situ recycling method is limited by extraction efficiency of NaBr into the aqueous phase and dilution of the NaBr in the aqueous phase. Further, performing such an ex situ process is cost ineffective and energy intensive.

There remains a need for a cost-effective, efficient in-situ process for improving halogen utilization during halogenation of an isoolefin copolymer, for example butyl rubber.

SUMMARY

In one aspect, there is provided a process for producing a halogenated isoolefin copolymer, the process comprising contacting an unsaturated isoolefin copolymer cement, the cement comprising an unsaturated isoolefin copolymer dissolved in an organic solvent and having a water content of 1 wt % or greater based on total weight of the cement, under halogenation conditions with a halogenating agent and an aqueous solution of a $C_{1-20}$ organic peracid oxidant to form a two-phase reaction medium comprising an organic phase and an aqueous phase, the organic peracid oxidant capable of converting hydrogen halide to free halogen.

In another aspect, there is provided a process for producing a halogenated isoolefin copolymer, the process comprising contacting an unsaturated isoolefin copolymer cement, the cement comprising an unsaturated isoolefin copolymer dissolved in an organic solvent, under halogenation conditions with a halogenating agent and an aqueous solution of a $C_{1-4}$ organic peracid oxidant to form a two-phase reaction medium comprising an organic phase and an aqueous phase, the organic peracid oxidant capable of converting hydrogen halide to free halogen.

The process may further comprise recovering halogenated isoolefin copolymer containing at least 0.05 mol % of chemically combined halogen.

The present halogenation process advantageously results in increased halogen utilization by oxidizing hydrogen halide (HX) formed during halogenation of the unsaturated isoolefin copolymer back to molecular halogen ($X_2$) without the necessity for a low water content in the halogenation medium and without the need to use a surfactant to disperse the oxidant in the organic phase of the halogenation medium.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

The process involves polymerizing at least one isoolefin monomer and at least one copolymerizable unsaturated monomer in an organic diluent to produce a halogenatable isoolefin copolymer in an organic medium. Polymerization occurs in a polymerization reactor. Suitable polymerization reactors include flow-through polymerization reactors, plug flow reactor, moving belt or drum reactors, and the like. The process preferably comprises slurry polymerization of the monomers.

The halogenatable isoolefin copolymer preferably comprises repeating units derived from at least one isoolefin monomer and repeating units derived from at least one copolymerizable unsaturated monomer, and optionally repeating units derived from one or more further copolymerizable monomers. The halogenatable isoolefin copolymer preferably comprises an unsaturated isoolefin copolymer.

Suitable isoolefin monomers include hydrocarbon monomers having 4 to 16 carbon atoms. In one embodiment, the isoolefin monomers have from 4 to 7 carbon atoms. Examples of suitable isoolefins include isobutene (isobutylene), 2-methyl-1-butene, 3-methyl-1-butene, 2-methyl-2-butene, 4-methyl-1-pentene, 4-methyl-1-pentene and mixtures thereof. A preferred isoolefin monomer is isobutene (isobutylene).

Suitable copolymerizable unsaturated monomers include multiolefins, p-methyl styrene, β-pinene or mixtures thereof. Multiolefin monomers include hydrocarbon monomers having 4 to 14 carbon atoms. In one embodiment, the multiolefin monomers include conjugated dienes. Examples of suitable multiolefin monomers include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene, 1-vinyl-cyclohexadiene and mixtures thereof.

The halogenatable isoolefin copolymer may optionally include one or more additional copolymerizable monomers. Suitable additional copolymerizable monomers include, for example, styrenic monomers, such as alkyl-substituted vinyl aromatic co-monomers, including but not limited to a $C_1$-$C_4$ alkyl substituted styrene. Specific examples of additional copolymerizable monomers include, for example, α-methyl styrene, p-methyl styrene, chlorostyrene, cyclopentadiene and methylcyclopentadiene. Indene and other styrene derivatives may also be used. In one embodiment, the halogenatable isoolefin copolymer may comprise random copolymers of isobutylene, isoprene and p-methyl styrene.

In one embodiment, the halogenatoable isoolefin copolymer may be formed by copolymerization of a monomer mixture. Preferably, the monomer mixture comprises about 80-99.9 mol % of at least one isoolefin monomer and about 0.1-20 mol % of at least one copolymerizable unsaturated monomer, based on the monomers in the monomer mixture. More preferably, the monomer mixture comprises about 90-99.9 mol % of at least one isoolefin monomer and about 0.1-10 mol % of at least one copolymerizable unsaturated monomer. In one embodiment, the monomer mixture comprises about 92.5-97.5 mol % of at least one isoolefin monomer and about 2.5-7.5 mol % of at least one copolymerizable unsaturated monomer. In another embodiment, the monomer mixture comprises about 97.4-95 mol % of at least one isoolefin monomer and about 2.6-5 mol % of at least one copolymerizable unsaturated monomer.

If the monomer mixture comprises the additional copolymerizable with the isoolefins and/or copolymerizable unsaturated monomers, the additional copolymerizable monomer preferably replaces a portion of the copolymerizable unsaturated monomer. When a multiolefin monomer is used, the monomer mixture may also comprise from 0.01% to 1% by weight of at least one multiolefin cross-linking agent, and when the multiolefin cross-linking agent is present, the amount of multiolefin monomer is reduced correspondingly.

The unsaturated isoolefin copolymer may be prepared by any suitable method, of which several are known in the art. For example, the polymerization of monomers may be performed in a diluent in the presence of an initiator system (e.g. a Lewis acid catalyst and a proton source) capable of initiating the polymerization process. A proton source suitable in the present invention includes any compound that will produce a proton when added to the Lewis acid or a composition containing the Lewis acid. Protons may be generated from the reaction of the Lewis acid with proton sources to produce the proton and the corresponding by-product. Such reaction may be preferred in the event that the reaction of the proton source is faster with the protonated additive as compared with its reaction with the monomers. Proton generating reactants include, for example such as water, alcohols, phenol thiols, carboxylic acids, and the like or any mixture thereof. Water, alcohol, phenol or any mixture thereof is preferred. The most preferred proton source is water. A preferred ratio of Lewis acid to proton source is from 5:1 to 100:1 by weight, or from 5:1 to 50:1 by weight. The initiator system including the catalyst and proton source is preferably present in the reaction mixture in an amount of 0.02-0.1 wt %, based on total weight of the reaction mixture.

Alkyl aluminum halide catalysts are a particularly preferred class of Lewis acids for catalyzing solution polymerization reactions in accordance with the present invention. Examples of alkyl aluminum halide catalysts include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride and any mixture thereof. Preferred are diethyl aluminum chloride ($Et_2AlCl$ or DEAC), ethyl aluminum sesquichloride ($Et_{1.5}AlCl_{1.5}$ or EASC), ethyl aluminum dichloride ($EtAlCl_2$ or EADC), diethyl aluminum bromide ($Et_2AlBr$ or DEAB), ethyl aluminum sesquibromide ($Et_{1.5}AlBr_{1.5}$ or EASB) and ethyl aluminum dibromide ($EtAlBr_2$ or EADB) and any mixture thereof. In a particularly preferred initiator system, the catalyst comprises ethyl aluminum sesquichloride, preferably generated by mixing equimolar amounts of diethyl aluminum chloride and ethyl aluminum dichloride, preferably in a diluent. The diluent is preferably the same one used to perform the copolymerization reaction.

The diluent may comprise an organic diluent. Suitable organic diluents may include, for example, alkanes, chloroalkanes, cycloalkanes, aromatics, hydrofluorocarbons (HFC) or any mixture thereof. Chloroalkanes may include, for example methyl chloride, dichloromethane or any mixture thereof. Methyl chloride is particularly preferred. Alkanes and cycloalkanes may include, for example, isopentane, cyclopentane, 2,2-dimethylbutane, 2,3-dimethylbutane, 2-methylpentane, 3-methylpentane, n-hexane, methylcyclopentane, 2,2-dimethylpentane or any mixture thereof. Alkanes and cycloalkanes are preferably C6 solvents, which include n-hexane or hexane isomers, such as 2-methyl pentane or 3-methyl pentane, or mixtures of n-hexane and such isomers as well as cyclohexane. The monomers are generally polymerized cationically in the diluent at temperatures in a range of from $-120°$ C. to $+20°$ C., preferably $-100°$ C. to $-50°$ C., more preferably $-95°$ C. to $-65°$ C. The temperature is preferably about $-80°$ C. or colder.

Where the diluent comprises chloroalkanes (e.g. methyl chloride) in a slurry polymerization process, the diluent as well as any residual monomers may be removed from the unsaturated isoolefin copolymer by flash separation using steam. Removal of the diluent and residual monomers in such a 'wet' process leaves a polymer containing a significant amount of water. The polymer is dissolved in organic solvent to provide a polymer cement having a significant water content, for example 1 wt % or greater or 1.5 wt % or greater, based on total weight of the cement. In some embodiments, the water content of the cement may be 3 wt % or less, based on total weight of the cement. In some embodiments, the water content of the cement may be 1-30 wt % or 1.5-15 wt % or 2-30 wt % or 2-20 wt % or 2-15 wt % or 5-20 wt % or 5-15 wt % or 5-10 wt % or 10-15 wt %, based on total weight of the cement.

Where the diluent comprises chloroalkanes (e.g. methyl chloride) or alkanes (e.g. hexanes) in a slurry or a solution polymerization process, the diluent as well as any residual monomers may be removed from the unsaturated isoolefin copolymer by flash separation using a heated organic solvent in which the unsaturated isoolefin copolymer is soluble or by simple distillation. Where simple distillation is used, some of the organic diluent may remain as organic solvent in the cement. Removal of the diluent and residual monomers in such a 'dry' process provides a polymer cement containing less water, for example less than 1 wt %, or even 0 wt %, water based on total weight of the cement.

To form the halogenated isoolefin copolymer, the unsaturated isoolefin copolymer may be subjected to a halogenation process using a halogenating agent under halogenation conditions. Halogenation can be performed by adapting a process known by those skilled in the art (for example the procedures described in Rubber Technology, 3rd Ed., Edited by Maurice Morton, Kluwer Academic Publishers, pp. 297-300 or U.S. Pat. No. 5,886,106 issued Mar. 23, 1999, the contents of both of which are herein incorporated by reference) and modifying the process as described herein.

To improve efficiency of halogenation, the halogenation process is modified by contacting an unsaturated isoolefin copolymer cement, in which the unsaturated isoolefin copolymer is dissolved in an organic solvent, with a halogenating agent and an aqueous solution of an oxidant comprising an organic peracid. A two-phase reaction medium comprising an organic phase and an aqueous phase is formed in which the organic peracid is partitioned between the organic and aqueous phases due to significant solubility of the organic peracid in the organic phase.

Halogenating agents useful for halogenating the unsaturated isoolefin copolymer may comprise molecular chlorine ($Cl_2$) or molecular bromine ($Br_2$) and/or organo-halide or inorganic halide precursors thereto, for example dibromo-dimethyl hydantoin, tri-chloroisocyanuric acid (TCIA), n-bromosuccinimide, sodium bromide, hydrogen bromide or the like. Preferably, the halogenating agent comprises chlorine ($Cl_2$) or bromine ($Br_2$), more preferably bromine. Preferably, halogenation comprises bromination. The amount of halogenating agent added is controlled to provide a final halogen content of at least 0.05 mol %, preferably 0.05-2.5 mol %, in the halogenated isoolefin copolymer. The amount of halogenating agent used has a linear relationship with the final halogen content (i.e. the functional halogen amount) on the halogenated isoolefin copolymer. A larger amount of halogenating agent leads to a larger functional halogen amount in the halogenated isoolefin copolymer.

Halogenation is performed in an organic solvent. The organic solvent is preferably an aliphatic solvent. The organic solvent preferably comprises an alkane, more preferably hexanes of pentanes.

Halogenation may be conducted for a length of time to achieve the desired level of halogenation. The length of time is preferably 60 minutes or less. Even at 20 minutes or less, or at 10 minutes or less, or at 5 minutes or less, significant halogenation of the unsaturated isoolefin copolymer may be achieved, irrespective of whether an emulsifier is used. Preferably, halogenation is conducted for a minimum of 1 minute. Preferably, the halogenation time is 1-60 minutes, or 1-20 minutes, or 1-10 minutes, or 1-5 minutes.

Halogenation may be conducted at any suitable temperature and is preferably conducted at a temperature up to about $90°$ C. In some embodiments, the temperature may be up to about $80°$ C. In other embodiments, the temperature may be up to about $65°$ C. However, lower temperatures generally provide for increased halogenation efficiency. The increased halogenation efficiency at lower temperatures is more pronounced at higher concentrations of the unsaturated isoolefin copolymer in the reaction medium. Temperatures in a range of $0-50°$ C. or $0-45°$ C. or $15-45°$ C. or $20-60°$ C. or $23-54°$ C. or $23-45°$ C. or $10-35°$ C. or $20-30°$ C. are preferred. In one embodiment, the unsaturated isoolefin copolymer is cooled before contacting the solution of the unsaturated isoolefin copolymer cement with the halogenating agent and the aqueous solution of organic peracid oxidant.

The unsaturated isoolefin copolymer is preferably present in the reaction medium in an amount of 1-60 wt %, based on total weight of the reaction medium. More preferably, the unsaturated isoolefin copolymer is present in an amount of 5-50 wt %, even more preferably 5-40 wt %, yet more preferably 10-33 wt %, even yet more preferably 10-30 wt %, for example 20 wt %, based on total weight of the reaction medium.

The aqueous phase is formed from the aqueous solution of oxidant, from water generated by the halogenation reaction and from any additional water contained in the unsaturated isoolefin polymer cement. The aqueous solution of oxidant together with the water generated by the halogenation reaction typically form less than 1 wt % of the reaction medium, for example 0.03-0.3 wt %, based on total weight of the reaction medium.

The reaction medium may contain 0-20 wt %, based on total weight of the reaction medium, of additional water arising from water contained in the unsaturated isoolefin polymer cement depending on the process used to prepare the polymer cement. The additional water is water from the unsaturated isoolefin polymer cement and does not include the water used to prepare the aqueous solution of the oxidant or the water generated by the halogenation reaction. It is an advantage of the present process that the reaction medium may contain significant amounts of additional water, for example 1-20 wt % additional water, based on total weight of the reaction medium. In some embodiments, the additional water may comprise or 1.5-15 wt % or 2-20 wt % or 2-15 wt % or 5-20 wt % or 5-15 wt % or 5-10 wt % of the reaction medium, based on total weight of the reaction medium. Even so, in some embodiments the reaction medium may contain an insignificant amount of additional water, for example less than 1 wt % additional water, or even 0 wt % additional water, based on total weight of the reaction medium.

Unlike hydrogen peroxide, the organic peracid has a significant solubility in the organic phase to provide sufficient concentration of the organic peracid in the organic phase to oxidize hydrogen halide (HX) formed during halogenation of the unsaturated isoolefin copolymer back to molecular halogen without the necessity for a low water content in the reaction medium and without the need to use a surfactant to disperse the oxidant in the organic phase. Prior art methods using hydrogen peroxide as the oxidant (e.g. U.S. Pat. No. 3,018,275) require that the reaction medium have less than 1 wt % water based on the total weight of the reaction medium, otherwise the excess water would solubilize the hydrogen peroxide sequestering the hydrogen peroxide in the aqueous phase thereby diminishing oxidation efficiency leading to no or less improvement in halogenation efficiency. As stated in U.S. Pat. No. 3,018,275: "It is necessary to have only a sufficient amount of water present to assist the reaction between the halogen and oxidizing agent to take place." Thus, in U.S. Pat. No. 3,018,275, there is no water added to the process other than in the hydrogen peroxide solution. The use of a surfactant, as in U.S. Pat. No. 5,681,901, to disperse the hydrogen peroxide in the organic phase is also unsatisfactory because the surfactant may contaminate the halogenated isoolefin copolymer, and the use of surfactant nevertheless does not provide satisfactory improvement in halogenation efficiency unless the water content of the reaction medium is less than 2 wt % and halogenation time is extended to 30-60 minutes. Extended halogenation time may result in changes to the microstructure of the halogenated isoolefin copolymer. In the present process, on the other hand, whether or not emulsifier is added, there is no change in halogenation efficiency at halogenation times of 5 minutes or less. Further, if the halogenation time is extended to 20 minutes, peracid plus emulsifier provides higher halogenation efficiency than hydrogen peroxide plus emulsifier by 10%, which is a significant improvement. Therefore, the present halogenation process may be performed in a reaction medium having less than 1 wt % water and/or in the presence of a surfactant, but, unlike prior art processes, there is no requirement for these conditions in order to achieve improved halogen utilization.

The organic peracids useful in the present process are at least partially soluble in the organic phase, allowing the oxidant to partition between the organic and aqueous phases, thereby regenerating molecular halogen at an accelerated rate. The rate of reaction for the conversion of halide back into halogen is sufficiently fast to allow the reaction to take place in a continuous reactor with a short residence time, thereby significantly reducing the cost of engineering a large contact vessel for the halogenating reaction. Further, because the organic peracid oxidant is at least partially soluble in the organic phase, performance is maintained even at elevated water concentrations relevant at an industrial scale. Because the organic peracid has improved solubility and reactivity in the organic phase in comparison to hydrogen peroxide, the effectiveness of the organic peracid at regenerating $Br_2$ is less sensitive to water concentrations in the reaction medium than is hydrogen peroxide.

The organic peracids are preferably $C_{1-20}$ organic peracids, more preferably $C_{1-6}$ organic peracids, yet more preferably $C_{1-4}$ organic peracids or $C_{1-3}$ organic peracids. Some examples of organic peracids include performic acid (PFA), peracetic acid (PAA), perpropanoic acid (PPA), perbutanoic acid (PBA), t-butyl hydroperoxide (t-BHP), pervaleric acid (PVA) and any mixture thereof. The organic peracid may be pre-made and dissolved directly into the aqueous solution for contacting with the organic solvent containing the unsaturated isoolefin copolymer cement.

Alternatively, or additionally, the organic peracid may be synthesized on-site from the reaction of a water-soluble oxidizing agent (e.g. hydrogen peroxide) with a suitable organic acid in the presence of a catalytic amount of a mineral acid (e.g. sulfuric acid). The organic acid and water-soluble oxidizing agent may be introduced into a reactor directly and allowed to eventually form the organic peracid. The organic peracid may be pre-formed by mixing the organic acid and the water-soluble oxidizing agent in an aqueous solution, and then adding the aqueous solution to the reaction medium to form the aqueous phase. Pre-forming the organic peracid by mixing the water-soluble oxidizing agent and the organic acid in an aqueous solution, and then adding the aqueous solution to the reaction medium to form the aqueous phase leads to a reduction in reaction time and/or a reduction in the size of the reactor required to perform the halogenation. On-site production of the organic peracid requires no storage of unstable chemicals and generates organic peracid only as needed leading to less waste.

The organic acid is soluble in the aqueous phase and at least partially soluble in the organic phase. The organic acid preferably has a partition coefficient (k) between water and 1-octanol of from 0.05 to 24.55, more preferably 0.25 to 24.55, yet more preferably 0.25 to 17. With these preferred partition coefficients, the organic acid is more preferably a $C_{1-6}$ organic acid, yet more preferably a $C_{1-4}$ organic acid or a $C_{1-3}$ organic acid. At decreasing water content in the reaction medium, organic acids with fewer carbon atoms are preferred. At or below 10 wt % additional water, $C_{1-4}$ organic acids are preferred. At or below 6 wt % additional water, $C_{1-3}$ organic acids are preferred. At 0 wt % additional water, $C_1$ organic acid is preferred. Organic peracids with more carbon atoms appear to be less sensitive to water content, perhaps because they are less soluble in water. Further, as water content increases, micellization of the aqueous phase in the organic phase is diminished providing less surface area contact between the phases, which may reduce transfer of the more water-soluble organic peracids between the organic and aqueous phases.

Some examples of organic acids include formic acid (FA), acetic acid (AA), propanoic acid (PA), butanoic acid (BA), valeric acid (VA), any branched derivatives thereof and any mixture thereof. The use of a water-soluble oxidizing agent with an organic acid permits re-oxidizing the organic acid to the organic peracid, thereby maintaining the concentration of the organic peracid in the organic phase. The rate of reaction may be controlled by the choice of organic acid, which limits hazards associated with storing highly reactive organic peracids. In some embodiments, formic acid is preferred due to high reactivity and decomposition into non-hazardous and easily removed byproducts upon completion of the process (e.g. $CO_2$, $H_2O$).

The concentration of organic peracid present in the reaction medium is preferably at least 0.06 moles of organic peracid per mole of halogenating agent, or at least 0.1 moles of organic peracid per mole of halogenating agent, or at least 0.5 moles of organic peracid per mole of halogenating agent. The concentration of organic peracid present in the reaction medium is preferably 1-5 moles, more preferably 1-3 moles, of organic peracid per mole of halogenating agent. When an organic acid and a water-soluble oxidizing agent are used to generate the organic peracid, the organic acid and water-soluble oxidizing agent are present in sufficient concentrations to generate the organic peracid at the above concentrations. The desired concentration of organic peracid is a function of the desired halogenation time. For a halogenation time of 5 minutes, 1-2 moles, for example 2 moles, of organic peracid per mole of halogenating agent is preferred. Lower concentrations of organic peracid may be offset by longer halogenation time.

In the present process, all or some of the halogenating agent may comprise hydrogen halide (HX) added to the aqueous phase. Because HX is converted into molecular halogen ($X_2$) by the organic peracid in the aqueous phase, the added HX can act as a source of halogenating agent.

The isoolefin copolymer is brominated with $Br_2$ in the organic phase (e.g. hexanes or isopentane) to form brominated isoolefin copolymer and HBr. HBr reacts with peracid in the organic phase to form $Br_2$, carboxylic acid and water. The water and the carboxylic acid, which is completely soluble in water, transfer to the aqueous phase where hydrogen peroxide ($H_2O_2$) dissolved in the aqueous phase reacts with the carboxylic acid to form the peracid. The peracid, being at least partially soluble in the organic phase is in equilibrium between the organic and aqueous phases. As the peracid reacts with HBr, concentration of the peracid in the organic phase is maintained by transfer of peracid from the aqueous phase to the organic phase. In this manner, peracid is continuously produced to regenerate $Br_2$ in the organic phase thereby increasing bromine utilization. After bromination is complete, residual carboxylate produced during a neutralization step may be extracted from the brominated isoolefin copolymer by washing with water, in which the carboxylate is completely soluble.

EXAMPLES

Material and Methods:

Isobutylene-isoprene polymer and Epoxidized Soybean Oil (ESBO) were obtained from ARLANXEO. The remaining materials were used as received: Hexanes (VWR), Sodium Hydroxide (VWR), 99.99% Bromine (Sigma Aldrich), 88 wt % Formic Acid (Sigma Aldrich), 30 wt % Hydrogen Peroxide (VWR), 98 wt % Sulfuric Acid (Sigma Aldrich), 32 wt % Peracetic Acid solution (Sigma-Aldrich), 99.5 wt % Propionic Acid (VWR), Calcium Stearate (Alfa Aesar), Irganox™-1010 (BASF).

Performic Acid Synthesis: Formic acid (12.5 mL, 88 wt %) was added to a 50 mL Erlenmeyer flask with a glass pipette. The formic acid was set in an ice bath and stirred magnetically for 5 minutes to cool down. Sulfuric acid (1.15 mL, 98 wt %) was added to the solution and stirred for 1 minute. Hydrogen peroxide (12.5 mL, 30 wt %) was added dropwise to the solution with a glass pipette over 1 minute. After hydrogen peroxide addition was completed, the solution was left stirring in ice bath for 1 hour. After the hour of waiting, the PFA solution was added directly into the bromination reactor prior to bromine addition.

Control Bromination: 250 g of isobutylene-isoprene copolymer (butyl rubber) containing 1.78 mole % isoprene was cut into small pieces and added to a 5 L jacketed reactor equipped with an overhead stirrer, and prefilled with "X" mL of hexanes. Stir speed was set to 150 rpm while the base material pieces were added to the reactor. The solution was stirred for 24 hours to fully dissolve. After the isobutylene-isoprene polymer had fully dissolved, "Y" mL of water was added to the reactor to provide a butyl rubber cement. The values of X and Y are chosen to provide butyl rubber cements with the water contents in the Examples below. A circulating bath connected to the jacketed reactor was set to desired temperature to heat reactor and the butyl rubber cement was stirred at 350 rpm for at least 15 minutes. Bromine (3.30 mL, 10.30 g, 0.064 moles) was added with a syringe. The reaction was stirred for 5 minutes, after which 160 mL of 2.5 M NaOH solution was added to quench the reaction. An additional 250 mL of water was added to aid in mixing. The mixture was continued to stir at 350 rpm for 5 minutes. An additional 1 L of water was added and allowed to stir at 350 rpm for another 5 minutes. Stirring was reduced to 150 rpm and the mixture was stirred for an additional 5 minutes. The reactor stirring was stopped and the water phase was drained through the bottom drain valve. The cement of brominated isobutylene-isoprene copolymer was washed with additional water until the pH was neutral, to remove any residual inorganic salts. A solution of polymer stabilizers (6.82 g of calcium stearate, 0.125 g of Irganox™-1010, and 3.25 g of ESBO) in hexanes and added to the reactor. The cement was drained and steam coagulated using low pressure steam for about 1 hour. The recovered brominated polymer was dried on a hot mill. Bromine content was determined using $^1$H-NMR spectroscopy.

Performic acid Bromination: 250 g of isobutylene-isoprene copolymer (butyl rubber) containing 1.78 mole % isoprene was cut into small pieces and added to a 5 L jacketed reactor equipped with an overhead stirrer, and prefilled with "X" mL of hexanes. Stir speed was set to 150 rpm while the base material pieces were added to the reactor. The solution was stirred for 24 hours to fully dissolve. After the isobutylene-isoprene copolymer had fully dissolved, "Y" mL of water was added to the reactor to provide a butyl rubber cement. The values of X and Y are chosen to provide butyl rubber cements with the water contents in the Examples below. A circulating bath connected to the jacketed reactor was set to desired temperature to heat reactor and the butyl rubber cement was stirred at 350 rpm for at least 15 minutes. The previously prepared PFA solution (25 mL, 10 wt %) was added, then bromine (2.15 mL, 6.71 g, 0.042 moles) was added with a syringe. The reaction was stirred for 5 minutes, after which 160 mL of 2.5 M NaOH solution was added to quench the reaction. An additional 250 mL of water was added to aid in mixing. The mixture was continued to stir at 350 rpm for 5 minutes. An additional 1 L of water was added and allowed to stir at 350 rpm for another 5 minutes. Stirring was reduced to 150 rpm and the was stirred for an additional 5 minutes. The reactor stirring was stopped and the water phase was drained through the bottom drain valve. The cement of brominated isobutylene-isoprene copolymer was washed with additional water until the pH was neutral, to remove any residual inorganic salts. A solution of polymer stabilizers (6.82 g of calcium stearate, 0.125 g of Irganox™-1010, and 3.25 g of ESBO) in hexanes and added to the reactor. The cement was drained and steam coagulated using low pressure steam for about 1 hour. The recovered brominated polymer was dried on a hot mill. Bromine content was determined using $^1$H-NMR spectroscopy.

Bromine Utilization Calculations

Bromine utilization in the bromination process may be measured using bromine atom efficiency (BAE), which is given by the following equation:

$$BAE(\%) = \frac{\text{atoms of Br on polymer}}{\text{atoms of Br from bromine added to reaction}} \times 100\%$$

Atoms of Br on polymer is calculated from $^1$H-NMR. Atoms of Br from bromine added to the reaction is calculated by volume of bromine used in reaction. From the equation, it is evident that ideal conditions would yield a BAE of 50%, where 50% of the Br is in waste HBr. Therefore, the theoretical maximum fraction of bromine present in the reaction mixture which can be introduced into the butyl rubber polymer is 50%. However, in practice the BAE is usually less than 45%, for example 30-45% or 35-45%.

In some previous methods (e.g. in U.S. Pat. Nos. 3,018,275 and 5,681,901) bromine utilization is measured using molecules of molecular bromine added to the reaction, which provides numerical results that are double the BAE because there are two atoms of bromine in every molecule of molecular bromine. Further, these previous methods use X-ray diffraction in order to estimate the amount of Br bound to the polymer. However, this method will also measure NaBr arising from the neutralization process, and which is trapped within the polymer matrix. Trapped NaBr does not necessarily measure the amount of Br chemically bound to the polymer, and generally provides numbers for bromine utilization efficiency that are higher than the actual efficiency.

Example 1: Effect of Organic Peracid on BAE

Butyl rubber cements were obtained from slurry polymerization of isobutene and isoprene in methyl chloride according to known methods to provide cements having a water content of 10 wt % and a butyl rubber (IIR) content of 10 wt %. 250 g of the cement was brominated in the laboratory with varying amounts of bromine ($Br_2$) as shown in Table 1 following the procedure described above using no oxidant to recycle bromine. Table 1 illustrates the BAEs obtainable without the use of oxidant. As shown in Table 1, typical BAE obtainable under laboratory conditions is around 30%.

TABLE 1

| Amount $Br_2$ added (mL) | Amount Br atoms added (mol) | Functional Br by NMR (mol %) | Functional Br amount (mol) | BAE (%) |
|---|---|---|---|---|
| 3.3 | 0.1289 | 0.89 | 0.0394 | 30.5 |
| 2.64 | 0.1031 | 0.67 | 0.0297 | 28.8 |
| 2.15 | 0.0840 | 0.57 | 0.0253 | 30.1 |
| 0.66 | 0.0258 | 0.16 | 0.0071 | 27.5 |

The same butyl rubber cement was brominated using 1 molar equivalent of performic acid (PFA) per mole of bromine to recycle bromine during the bromination reaction. The PFA was produced by the reaction of formic acid and hydrogen peroxide and added immediately before the addition of bromine. Three trials were performed using 2.15 mL bromine and 250 g of IIR, and the average result is shown in Table 2. As seen in Table 2 in comparison with Table 1, the use of performic acid increases BAE from 30.1% to 46.4%, which is more than a 15% increase in BAE corresponding to a 36.6% reduction in $Br_2$ usage. The use of performic acid as an oxidant to recycle bromine during bromination of butyl rubber significantly improves bromine utilization leading to less cost and less waste.

TABLE 2

| Amount $Br_2$ (mL) | Amount Br atoms (mol) | Amount PFA added (mol) | Functional Br by NMR (mol %) | Functional Br amount (mol) | BAE (%) |
|---|---|---|---|---|---|
| 2.15 | 0.0840 | 0.0000 | 0.57 | 0.0253 | 30.1 |
| 2.15 | 0.0840 | 0.0840 | 0.88 | 0.0387 | 46.4 |

Example 2: Effect of Additional Water Content on BAE

Figure 1A:
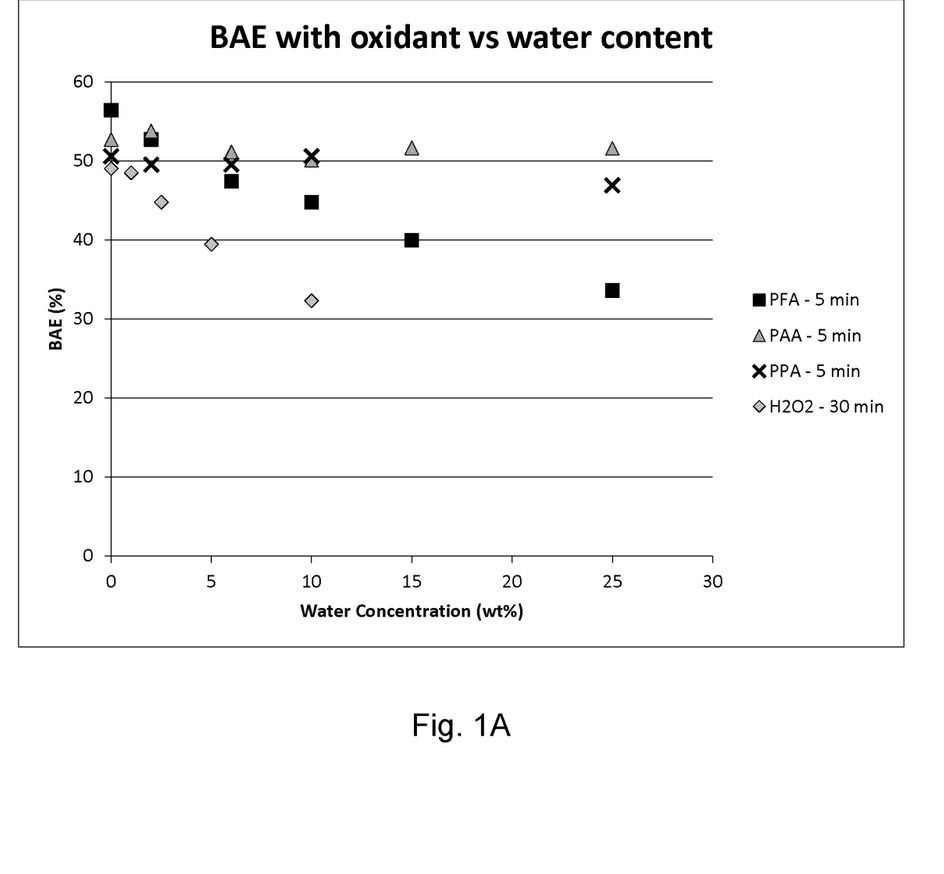
FIG. 1A is a graph of Bromine Atom Efficiency (BAE %) vs. Concentration of Additional Water (wt %) for a first experiment showing the effect of additional water content on bromination efficiency when using various oxidants to recycle bromide back to bromine.

Butyl rubber cements were obtained from slurry polymerization of isobutene and isoprene in methyl chloride according to known methods to provide cements having water contents from 0 wt % to 15 wt %. These cements were brominated following the procedure described above using 1 molar equivalent of oxidant. The oxidants were hydrogen peroxide ($H_2O_2$), performic acid (PFA), peracetic acid (PAA) and perpropionic acid (PPA). Brominations using $H_2O_2$ were performed with a butyl rubber (IIR) concentration in the reaction medium of 10 wt % at 50° C. for 30 minutes, conditions which are preferred for $H_2O_2$. Brominations using the organic peracids were performed with a butyl rubber (IIR) concentration in the reaction medium of 20 wt % at 45° C. for 5 minutes. FIG. 1A provides the results. A similar experiment was performed in which all the bromination reactions using peracids or $H_2O_2$ were performed with a butyl rubber (IIR) concentration in the reaction medium of 20 wt % at 45° C. for 5 minutes, the results of which are shown in FIG. 1B.

Figure 1B:
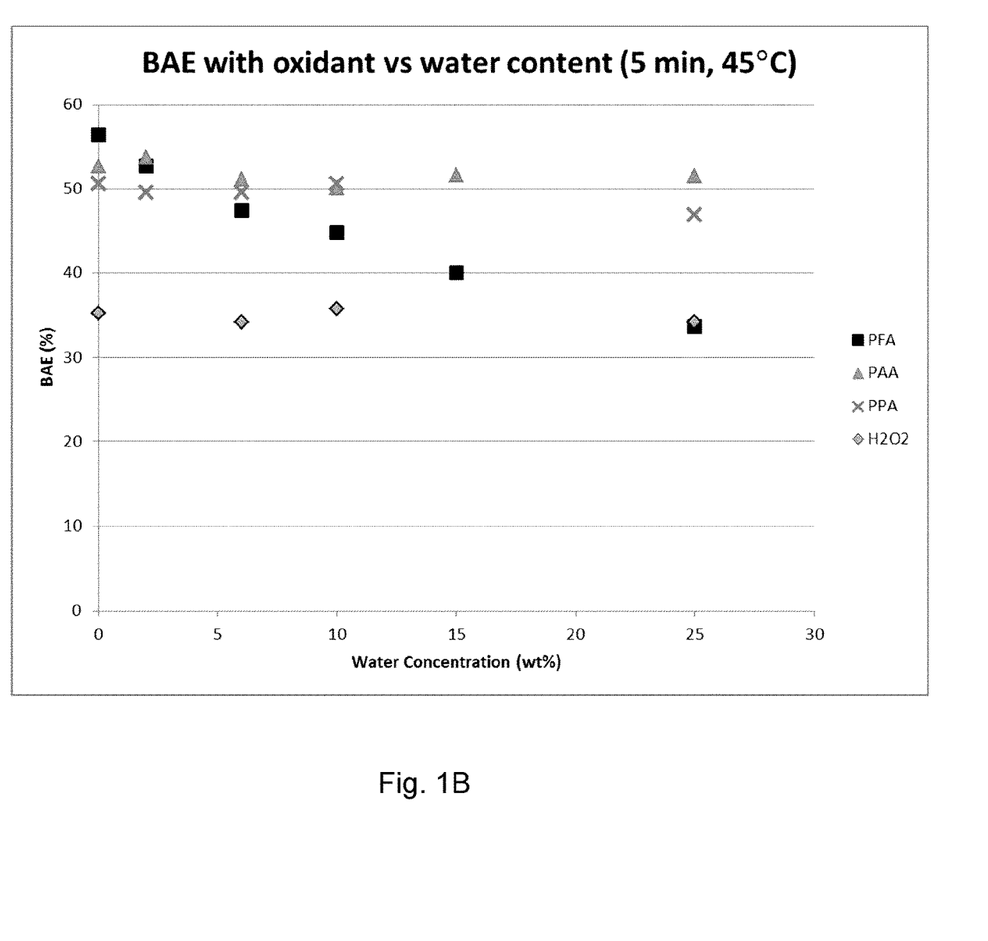
FIG. 1B is a graph of Bromine Atom Efficiency (BAE %) vs. Concentration of Additional Water (wt %) for a second experiment showing the effect of additional water content on bromination efficiency when using various oxidants to recycle bromide back to bromine.

FIG. 1A and FIG. 1B illustrate that bromination efficiency decreases with increasing additional water content. However, the decrease in bromination efficiency with increasing additional water content is not as sharp for the organic peracids as for hydrogen peroxide, demonstrating that the organic peracids are more tolerant to high water content than hydrogen peroxide. Further, at 10 wt % additional water, the performance of hydrogen peroxide (BAE=32%) is no better than the usual bromination efficiency when not using oxidant to recycle bromine. In contrast, all of the organic peracids provided bromination efficiencies of 40% or greater over the entire range of 0-15 wt % additional water content. Furthermore, the use of organic peracids results in reaction times that are 6 times less than the reaction time using hydrogen peroxide, even at higher IIR concentrations and lower temperature.

FIG. 1A and FIG. 1B also illustrate that bromination efficiency when using PAA or PPA remains relatively constant with increasing additional water content in comparison to PFA, while PFA provides higher bromination efficiency than PAA and PPA when no additional water is present (i.e. 0 wt % additional water). Therefore, lower molecular weight organic peracids are more useful at lower additional water content, while higher molecular weight organic peracids are more useful at higher additional water content in the bromination reaction mixture. Bromination efficiencies of greater than 50%, which have been achieved with the use of organic peracids, highlight that bromine is being recycled and that bromine efficiency is being measured as mass efficiency, not stoichiometric efficiency.

FIG. 1B illustrates that in addition to the fact that peracids provide significant improvement in bromine efficiency at higher water content, the time required to achieve this improvement is very low. In contrast, there is no appreciable benefit to using hydrogen peroxide on the same short time scale as peracids.

Example 3: Effect of IIR Concentration on BAE

Figure 2:
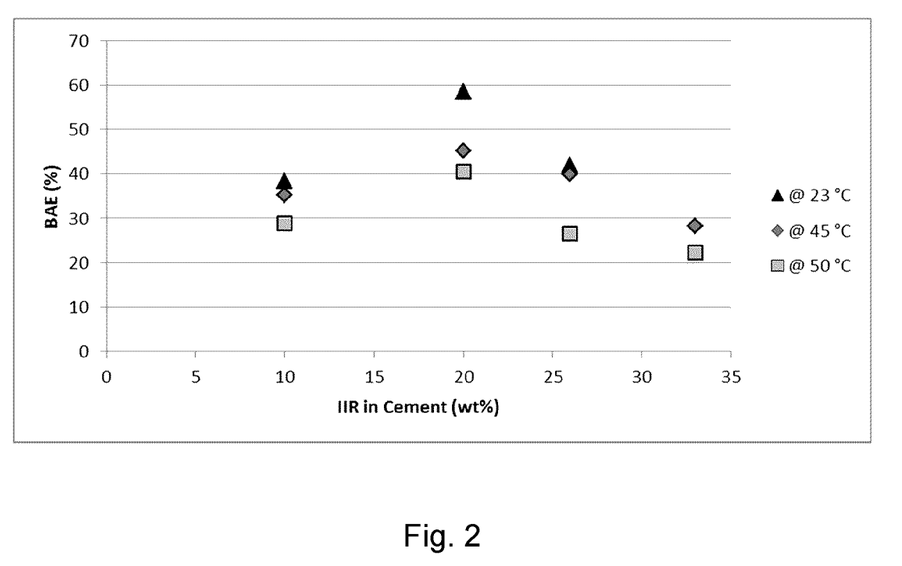
FIG. 2 is a graph of Bromine Atom Efficiency (BAE %) vs. Concentration of Butyl Rubber (IIR) (wt %) in the reaction medium showing the effect of butyl rubber concentration on bromination efficiency.

Butyl rubber cements were obtained from slurry polymerization of isobutene and isoprene in methyl chloride according to known methods to provide cements having a water content of 10 wt % and butyl rubber (IIR) content in a range of 10-33 wt %. These cements were brominated at 23° C., 45° C. and 50° C. following the procedure described above using 1 molar equivalent of performic acid (PFA). FIG. 2 illustrates that bromination efficiency peaks when the IIR concentration is around 20 wt %, which is consistent across the range of reaction temperatures. FIG. 2 also illustrates that bromination efficiency is higher at lower reaction temperature.

Further, as seen in Table 3, as the IIR concentration in the cement increases bromination efficiency increases significantly at the same temperature. In addition, decreasing reaction temperature from 45° C. to 23° C. also increases bromination efficiency significantly.

TABLE 3

| IIR Content (wt %) | T (° C.) | Functional Br (mol %) | BAE (%) |
| --- | --- | --- | --- |
| 10 | 23 | 0.80 | 42.2 |
| 10 | 45 | 0.58 | 30.6 |
| 20 | 23 | 1.04 | 54.8 |
| 20 | 45 | 0.81 | 42.7 |

Example 4: Effect of Organic Peracid Concentration on BAE

Figure 3:
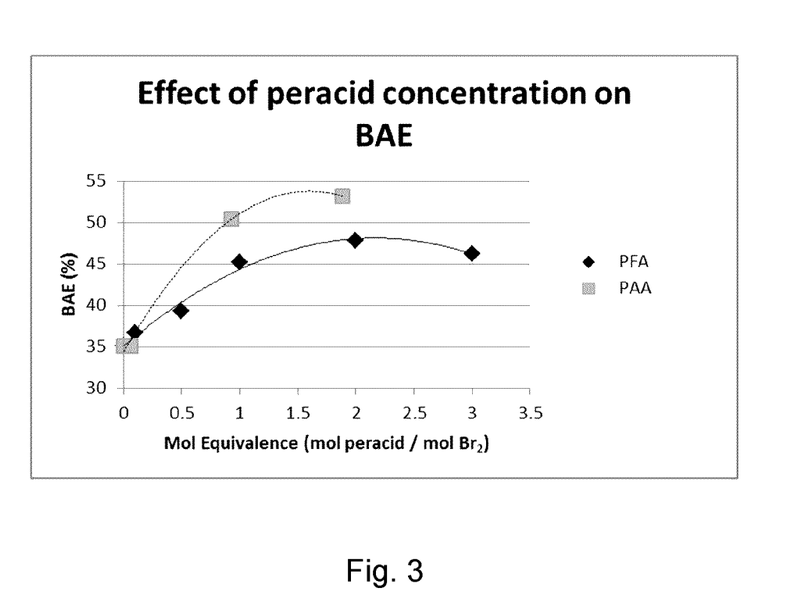
FIG. 3 is a graph of Bromine Atom Efficiency (BAE %) vs. Concentration of Peracid (mol Peracid per mol $Br_2$) in the reaction medium showing the effect of organic peracid concentration on bromination efficiency. PFA is performic acid and PAA is peracetic acid.

Butyl rubber cements were obtained from slurry polymerization of isobutene and isoprene in methyl chloride according to known methods to provide cements having a water content of 10 wt % and butyl rubber (IIR) content of 20 wt %. These cements were brominated at 45° C. for 5 minutes following the procedure described above using 0, 0.06, 0.1, 0.5, 1, 2 or 3 molar equivalents of performic acid (PFA) or peracetic acid (PAA). FIG. 3 illustrates that bromination efficiency peaks around 2 molar equivalents of peracid.

Example 5: Effect of Temperature on BAE

Figure 4:
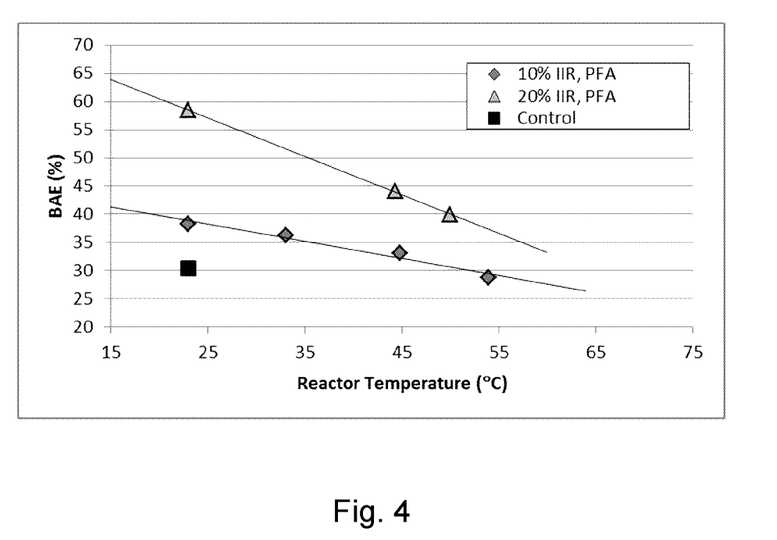
FIG. 4 is a graph of Bromine Atom Efficiency (BAE %) vs. Reaction Temperature (° C.) showing the effect of temperature on bromination efficiency.

Butyl rubber cements were obtained from slurry polymerization of isobutene and isoprene in methyl chloride according to known methods to provide cements having a water content of 10 wt % and butyl rubber (IIR) contents of 10 wt % and 20 wt %. These cements were brominated at various temperatures for 5 minutes following the procedure described above using 1 molar equivalent of performic acid (PFA). FIG. 4 illustrates that bromination efficiency declines as temperature increases from 23° C. to 54° C. at both 10 wt % and 20 wt % IIR. At 23° C. a BAE of 58% is achieved when brominating the cement with 20 wt % IIR. A Control where the IIR concentration is 10 wt % and no organic peracid is used to recycle bromine provides a BAE of 30% at 23° C., which is significantly lower than the BAEs obtained using PFA at that temperature.

Example 6: Comparison of Organic Peracid to Hydrogen Peroxide

In a bromination procedure adapted from U.S. Pat. No. 5,681,901, the contents of which is herein incorporated by reference, the use of organic peracid (performic acid (PFA)) with and without emulsifier was compared to the use of hydrogen peroxide ($H_2O_2$) with emulsifier. Table 4 shows the bromination conditions and the results. Table 4 shows that organic peracid outperforms hydrogen peroxide even when there is no additional water present in the bromination medium, and that there is no advantage to using an emulsifier with the organic peracid.

TABLE 4

| Oxidant | Emulsifier | Additional water (wt %) | IIR (wt %) | T (° C.) | Reaction Time (min) | BAE (%) |
| --- | --- | --- | --- | --- | --- | --- |
| PFA | None | 0 | 20 | 23 | 5 | 59 |
| PAA | None | 0 | 20 | 23 | 5 | 61 |
| PAA | None | 0 | 20 | 23 | 20 | 62 |
| PFA emulsion | Lutensol ™ T105 | 0 | 20 | 23 | 5 | 59 |
| PFA emulsion | Lutensol ™ T105 | 0 | 20 | 23 | 20 | 64 |
| $H_2O_2$ emulsion | Lutensol ™ T105 | 0 | 20 | 23 | 20 | 58 |

To compare the use of organic peracid to hydrogen peroxide at elevated water content, bromination reactions were performed over a varying length of time at 45° C. on a butyl rubber cement having 20 wt % IIR, 10 wt % additional water. In a first trial, performic acid (PFA) was pre-formed and then added to the bromination medium (PFA addition).

Figure 5:
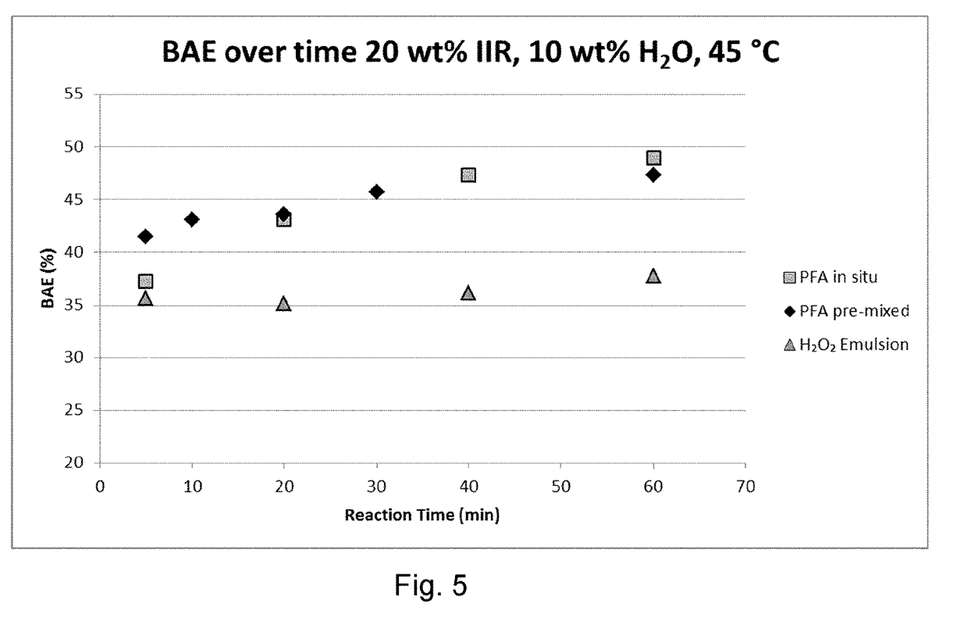
FIG. 5 is a graph of Bromine Atom Efficiency (BAE %) vs. Reaction Time (min) comparing bromination efficiency of organic peracid to hydrogen peroxide.

In a second embodiment, a mixture of formic acid and hydrogen peroxide was added to the bromination medium and permitted to form performic acid in situ (PFA in-situ). In an embodiment trial, hydrogen peroxide with emulsifier was to the bromination medium (hydrogen peroxide). FIG. 5 shows that the hydrogen peroxide with emulsifier provides a BAE of about 35% after 5 minutes, equivalent to not adding oxidant at all, and even after 60 minutes the BAE was less than 40%. In contrast, the pre-formed added organic peracid (PFA addition) resulted in BAE of close to 50% after 60 minutes, with the pre-formed added organic peracid (PFA addition) providing a BAE of over 40% after 5 minutes. Hydrogen peroxide, even when emulsified, provided almost no benefit to BAE at elevated additional water content.

Example 7: Comparison of In Situ Organic Peracid Production with and without Mineral Acid To compare the effect of mineral acid on BAE in a bromination process in which performic acid is generated in situ, bromination reactions were performed over a varying length of time at 45° C. on a butyl rubber cement having 20 wt % IIR and 10 wt % additional water with and without a catalytic amount of sulfuric acid ($H_2SO_4$). A mixture of formic acid and hydrogen peroxide was added to the bromination medium and permitted to form performic acid in situ, with or without the presence of $H_2SO_4$.

Figure 6:
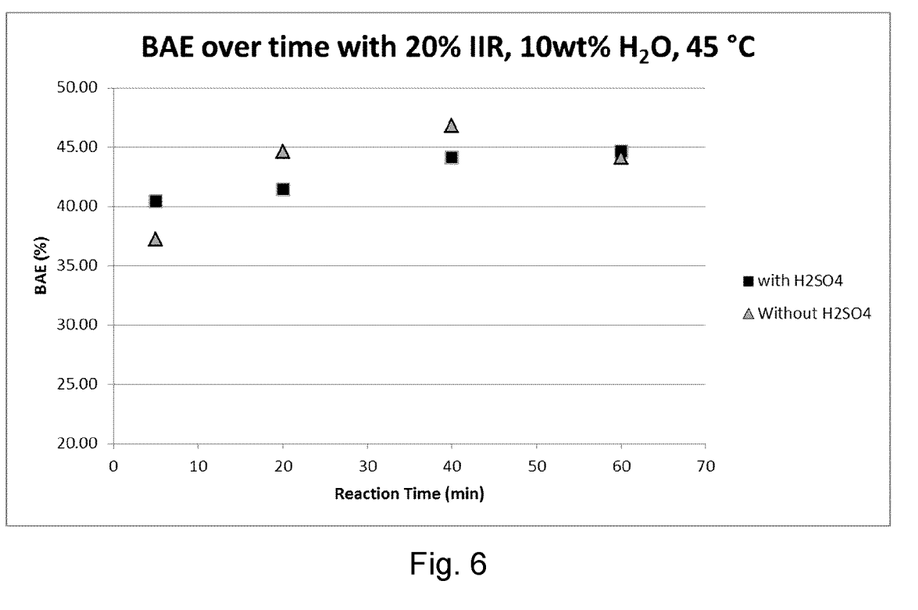
FIG. 6 is a graph of Bromine Atom Efficiency (BAE %) vs. Reaction Time (min) comparing bromination efficiency of in situ generated organic peracid in the presence of $H_2SO_4$ and absence of $H_2SO_4$.

FIG. 6 shows that the presence of mineral acid when the performic acid is generated in situ provides higher BAE up to about 15 minutes, at which time the presence of mineral no longer provides an advantage over the absence of mineral acid. At a reaction time of 15 minutes or less, preferably 10 minutes or less, there is a significant benefit to including mineral acid to catalyze the generation of peracid.

Example 8: Comparison of Isopentane to Hexanes for Bromine Recovery

To compare the impact of solvent, brominations were performed using hexanes and isopentane for comparison. Experiments were performed at 23° C. for simplicity of design, as comparisons at elevated temperatures would be more difficult due to boiling point differences. The experiments were performed on 20 wt % IIR solutions dissolved in the corresponding solvent. Table 5 provides results after 5 minutes of bromination for experiments where peracid was pre-formed and then added to the bromination medium. Table 6 provides results for experiments where peracid (PFA) was formed in situ.

In general, there was little difference in the bromine recovery between the two solvents. Both showed significant improvements in BAE vs the standard 35% BAE, where the standard 35% BAE is obtained without the use of peracids for recovery. Isopentane gave slightly lower efficiencies when using performic acid (PFA). Peracetic acid (PAA) gave the same performance in both solvents.

TABLE 5

| Solvent | Peracid | Water Content (wt %) | Functional Br (mol %) | BAE (%) |
|---|---|---|---|---|
| Isopentane | PFA | 10 | 1.00 | 53.2 |
| Hexanes | PFA | 10 | 1.10 | 58.4 |
| Isopentane | PFA | 0 | 1.02 | 54.2 |
| Hexanes | PFA | 0 | 1.10 | 58.5 |
| Isopentane | PAA | 10 | 1.05 | 55.8 |
| Hexanes | PAA | 10 | 1.04 | 55.3 |
| Isopentane | PAA | 0 | 1.05 | 55.8 |
| Hexanes | PAA | 0 | 1.15 | 61.1 |

TABLE 6

| Solvent | Water Content (wt %) | BAE (%) 5 min | 20 min | 40 min | 60 min |
|---|---|---|---|---|---|
| Isopentane | 10 | 54 | 54 | 53 | 54 |
| Hexanes | 10 | 59 | 58 | 58 | 59 |
| Isopentane | 0 | 52 | 51 | 51 | 52 |
| Hexanes | 0 | 58 | 61 | 64 | 64 |

The novel features will become apparent to those of skill in the art upon examination of the description. It should be understood, however, that the scope of the claims should not be limited by the embodiments, but should be given the broadest interpretation consistent with the wording of the claims and the specification as a whole.

What is claimed is:

1. A process for producing a halogenated isoolefin copolymer, the process comprising contacting an unsaturated isoolefin copolymer cement, the unsaturated isoolefin copolymer cement comprising an unsaturated isoolefin copolymer dissolved in an organic solvent, under halogenation conditions with a halogenating agent and an aqueous solution of a $C_{1-4}$ organic peracid oxidant to form a two-phase reaction medium comprising an organic phase and an aqueous phase, the organic peracid oxidant capable of converting hydrogen halide to free halogen;
  wherein the unsaturated isoolefin copolymer cement has a water content of less than 1 weight percent, based on a total weight of the unsaturated isoolefin copolymer cement.

2. The process of claim 1, further comprising recovering halogenated isoolefin copolymer containing at least 0.05 mol % of chemically combined halogen.

3. The process of claim 1, wherein the unsaturated isoolefin copolymer cement is produced by polymerizing at least one isoolefin monomer and at least one copolymerizable unsaturated monomer in an organic diluent and then removing residual monomers and the organic diluent.

4. The process of claim 3, wherein the residual monomers and organic diluent are removed by flash separation with heated organic solvent in which the unsaturated isoolefin copolymer is soluble or by simple distillation if the organic diluent is hexanes, to provide the unsaturated isoolefin copolymer cement containing hexanes, optionally wherein the heated organic solvent is heated hexanes or pentanes.

5. The process of claim 3, wherein the at least one isoolefin monomer is isobutene and the at least one copolymerizable unsaturated monomer is isoprene, p-methyl styrene or β-pinene.

6. The process of claim 3, wherein the at least one isoolefin monomer is isobutene and the at least one copolymerizable unsaturated monomer is isoprene, and the unsaturated isoolefin copolymer further comprises one or more additional copolymerizable monomers selected from the group consisting of α-methyl styrene, p-methyl styrene, chlorostyrene, cyclopentadiene, methylcyclopentadiene and indene.

7. The process of claim 1, wherein the organic peracid oxidant is a $C_{1-3}$ organic peracid.

8. The process of claim 1, wherein the organic peracid oxidant is performic acid.

9. The process of claim 1, wherein the organic peracid oxidant is pre-made and dissolved directly into the aqueous solution.

10. The process of claim 1, wherein the organic peracid oxidant is produced in situ in the aqueous solution by reacting an organic acid with a water-soluble oxidizing agent.

11. The process of claim 10, wherein the water-soluble oxidizing agent comprises hydrogen peroxide.

12. The process of claim 10, wherein the organic acid has a partition coefficient (k) between water and 1-octanol of from 0.05 to 24.55.

13. The process of claim 1, wherein the halogenating agent is $Br_2$.

14. The process of claim 1, wherein the unsaturated isoolefin copolymer is present in the reaction medium in an amount of 10-33 wt %, based on total weight of the two-phase reaction medium.

15. The process of claim 1, wherein the unsaturated isoolefin copolymer cement is cooled before contacting with the halogenating agent and the aqueous solution of organic peracid oxidant.

16. The process of claim 1, wherein the contacting the unsaturated isoolefin copolymer cement with the halogenating agent is conducted for 1-60 minutes at a temperature in a range of 20-60° C.

17. The process of claim 10, wherein the organic acid has a partition coefficient (k) between water and 1-octanol of from 0.25 to 24.55.

18. A process for producing a halogenated isoolefin copolymer, the process comprising contacting an unsaturated isoolefin copolymer cement, the unsaturated isoolefin copolymer cement comprising an unsaturated isoolefin copolymer dissolved in an organic solvent, under halogenation conditions with a halogenating agent and an aqueous solution of a $C_{1-4}$ organic peracid oxidant to form a two-phase reaction medium comprising an organic phase and an aqueous phase, the organic peracid oxidant capable of converting hydrogen halide to free halogen;

wherein the reaction medium has a water content arising from water in the unsaturated isoolefin copolymer cement of less than 1 wt %, based on a total weight of the two-phase reaction medium.

* * * * *

UNITED STATES PATENT AND TRADEMARK OFFICE
CERTIFICATE OF CORRECTION

| | | |
|---|---|---|
| PATENT NO. | : 11,760,815 B2 | |
| APPLICATION NO. | : 17/311267 | |
| DATED | : September 19, 2023 | |
| INVENTOR(S) | : Adrian H. Murray | |

It is certified that error appears in the above-identified patent and that said Letters Patent is hereby corrected as shown below:

On the Title Page

Page 2
References Cited
Item (56) FOREIGN PATENT DOCUMENTS
Delete "JP 2015/164966 A1 11/2015" and insert --WO 2015/164966 A1 11/2015--
Delete "WO H0297509A 4/1990" and insert --JP H0297509A 4/1990--

Signed and Sealed this
Fourteenth Day of November, 2023

Katherine Kelly Vidal
*Director of the United States Patent and Trademark Office*